Jan. 19, 1960 S. F. ELWOOD 2,921,394
PERPETUAL CALENDAR MACHINE
Filed July 18, 1957 10 Sheets-Sheet 1
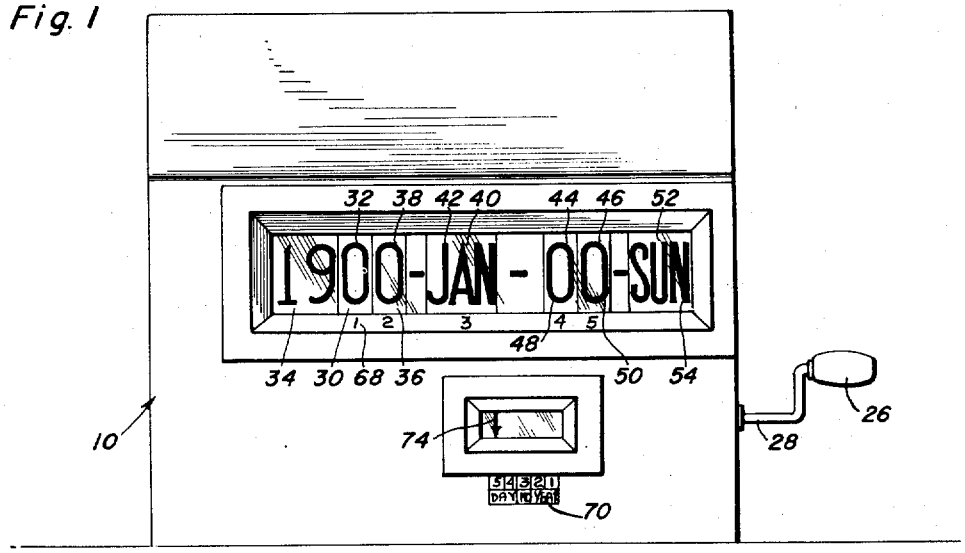
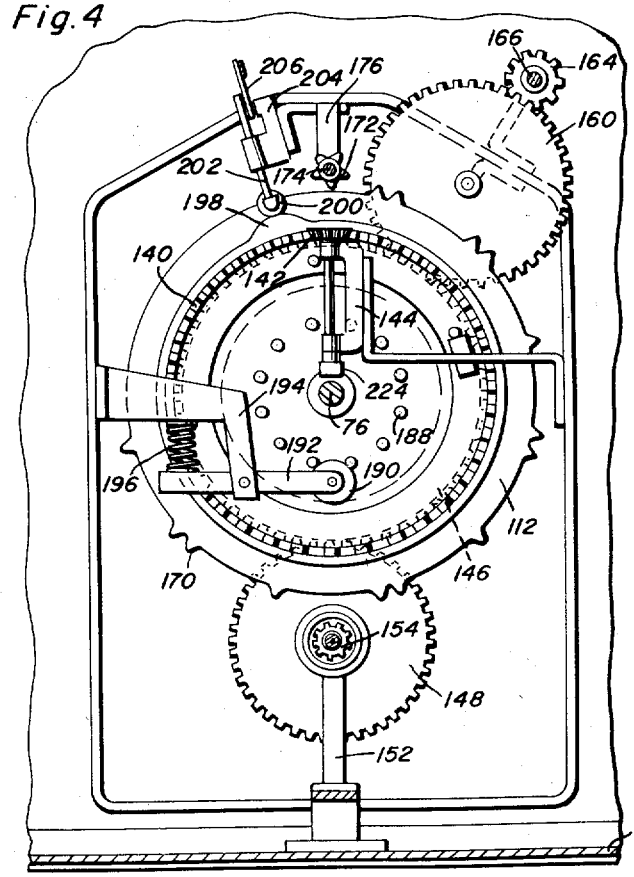
Sam F. Elwood
INVENTOR.

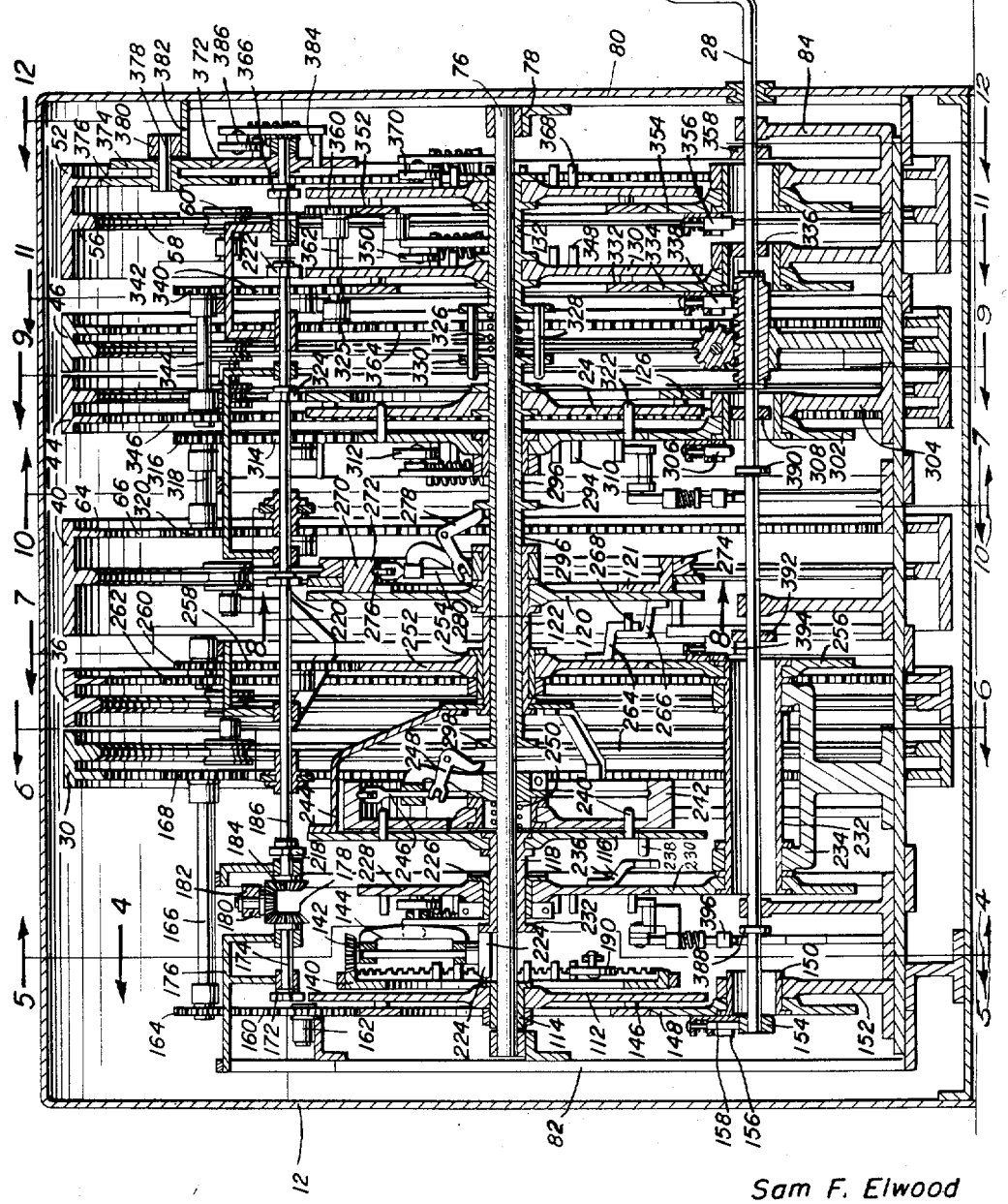

Jan. 19, 1960 S. F. ELWOOD 2,921,394
PERPETUAL CALENDAR MACHINE
Filed July 18, 1957 10 Sheets-Sheet 4

Sam F. Elwood INVENTOR.

BY *Clarence A. O'Brien*
*and Harvey B. Jackson*
Attorneys

Jan. 19, 1960 S. F. ELWOOD 2,921,394
PERPETUAL CALENDAR MACHINE
Filed July 18, 1957 10 Sheets-Sheet 5

Sam F. Elwood
INVENTOR.

Jan. 19, 1960 S. F. ELWOOD 2,921,394
PERPETUAL CALENDAR MACHINE
Filed July 18, 1957 10 Sheets-Sheet 6

Sam F. Elwood
INVENTOR.

BY Clarence A. O'Brien
and Harvey B. Jacobson
Attorneys

Jan. 19, 1960 S. F. ELWOOD 2,921,394
PERPETUAL CALENDAR MACHINE
Filed July 18, 1957 10 Sheets-Sheet 7

Sam F. Elwood
INVENTOR.

BY *Clarence A. O'Brien*
*and Harvey B. Jackson*
Attorneys

Jan. 19, 1960 S. F. ELWOOD 2,921,394
PERPETUAL CALENDAR MACHINE
Filed July 18, 1957 10 Sheets-Sheet 8

Sam F. Elwood INVENTOR.

BY *Clarence A. O'Brien*
*and Harvey B. Jackson*
Attorneys

Jan. 19, 1960 S. F. ELWOOD 2,921,394
PERPETUAL CALENDAR MACHINE
Filed July 18, 1957 10 Sheets-Sheet 9

Sam F. Elwood
INVENTOR.

Jan. 19, 1960     S. F. ELWOOD     2,921,394
PERPETUAL CALENDAR MACHINE

Filed July 18, 1957     10 Sheets-Sheet 10

Sam F. Elwood INVENTOR.

BY Clarence A. O'Brien
and Harvey B. Jacobson
Attorneys

United States Patent Office 2,921,394
Patented Jan. 19, 1960

2,921,394

PERPETUAL CALENDAR MACHINE

Sam F. Elwood, Sacramento, Calif.

Application July 18, 1957, Serial No. 672,613

10 Claims. (Cl. 40—114)

The present invention generally relates to a calendar device and more particularly to a perpetual calendar machine.

An object of the present invention is to provide a perpetual calendar machine in which information concerning a particular day in the past or future may be easily determined by moving a control handle in a particular manner.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a front elevation of the perpetual calendar machine of the present invention;

Figure 2 is a longitudinal sectional view taken generally upon a plane passing along the longitudinal center of the machine;

Figure 4 is a transverse sectional view taken substantially upon a plane passing along section line 4—4 in Figure 2 showing the details for the disk registering the decades;

Figure 13 is a partial plan sectional view showing the mechanism for moving the indicator pointer;

Figure 3:
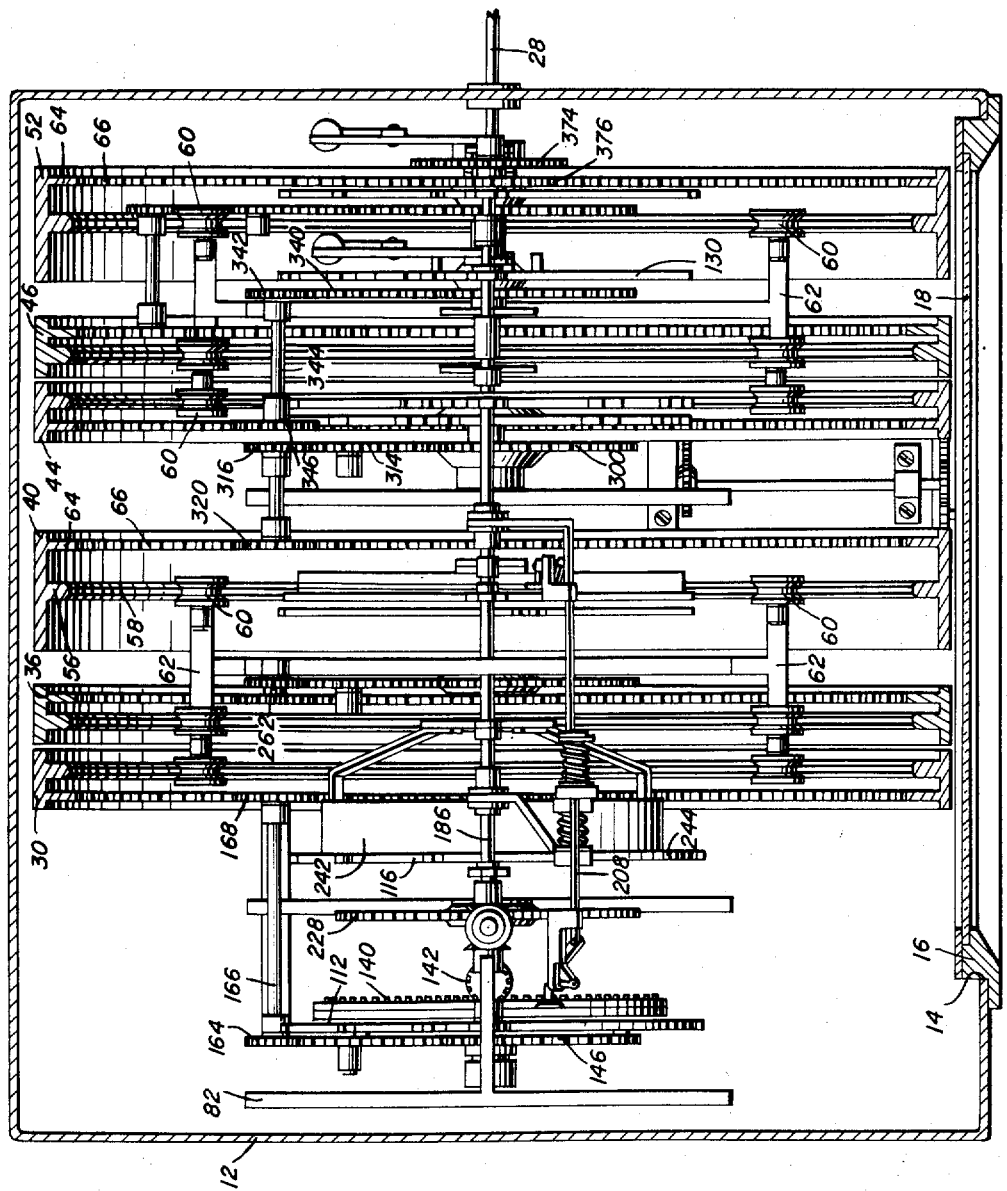
Figure 3 is a plan sectional view taken generally along the center of the machine.
Figure 5:
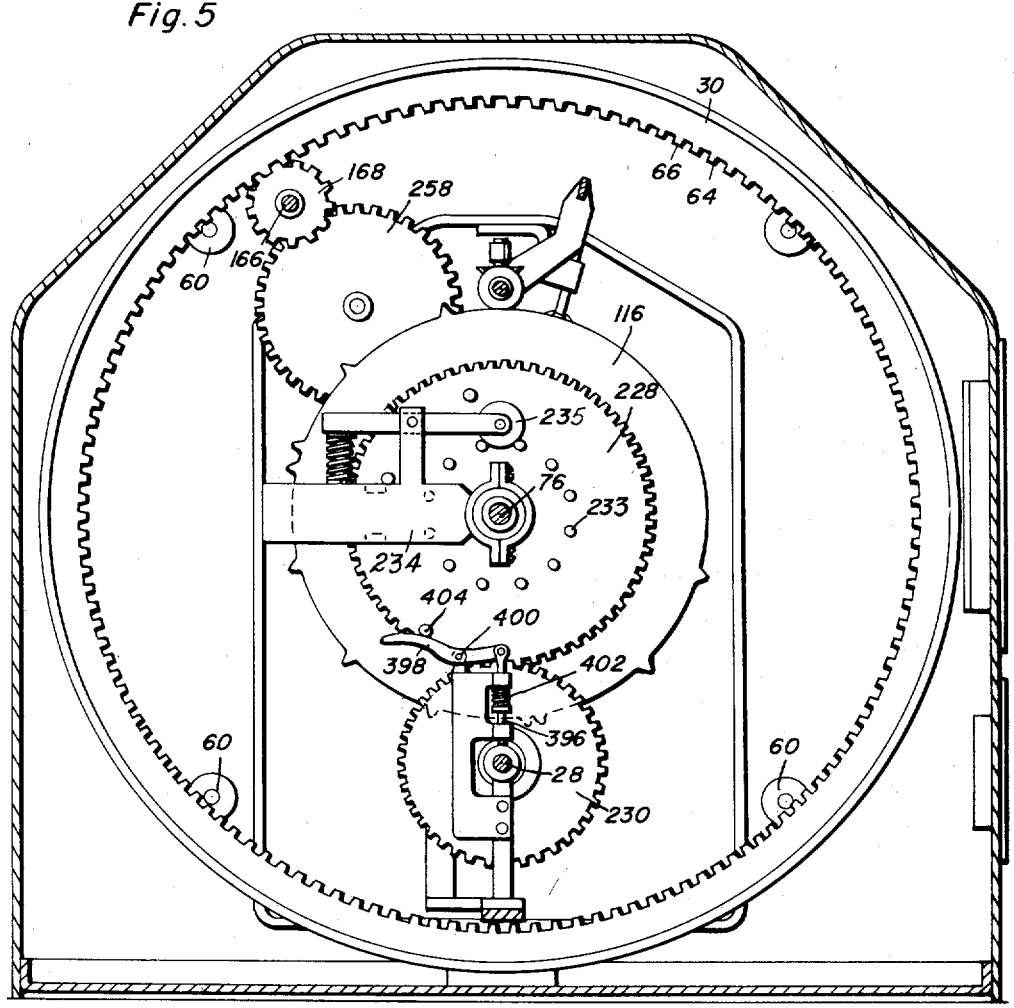
Figure 5 is a transverse sectional view taken substantially upon a plane passing along section line 5—5 in Figure 2 showing the disk for registering odd years.
Figure 16:
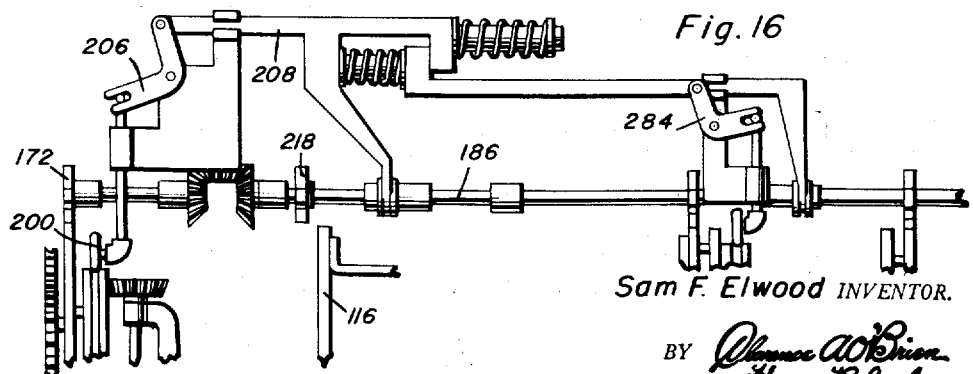
Figure 16 is a view similar to Figure 15 showing the shift mechanism in shifted position.
Figure 6:
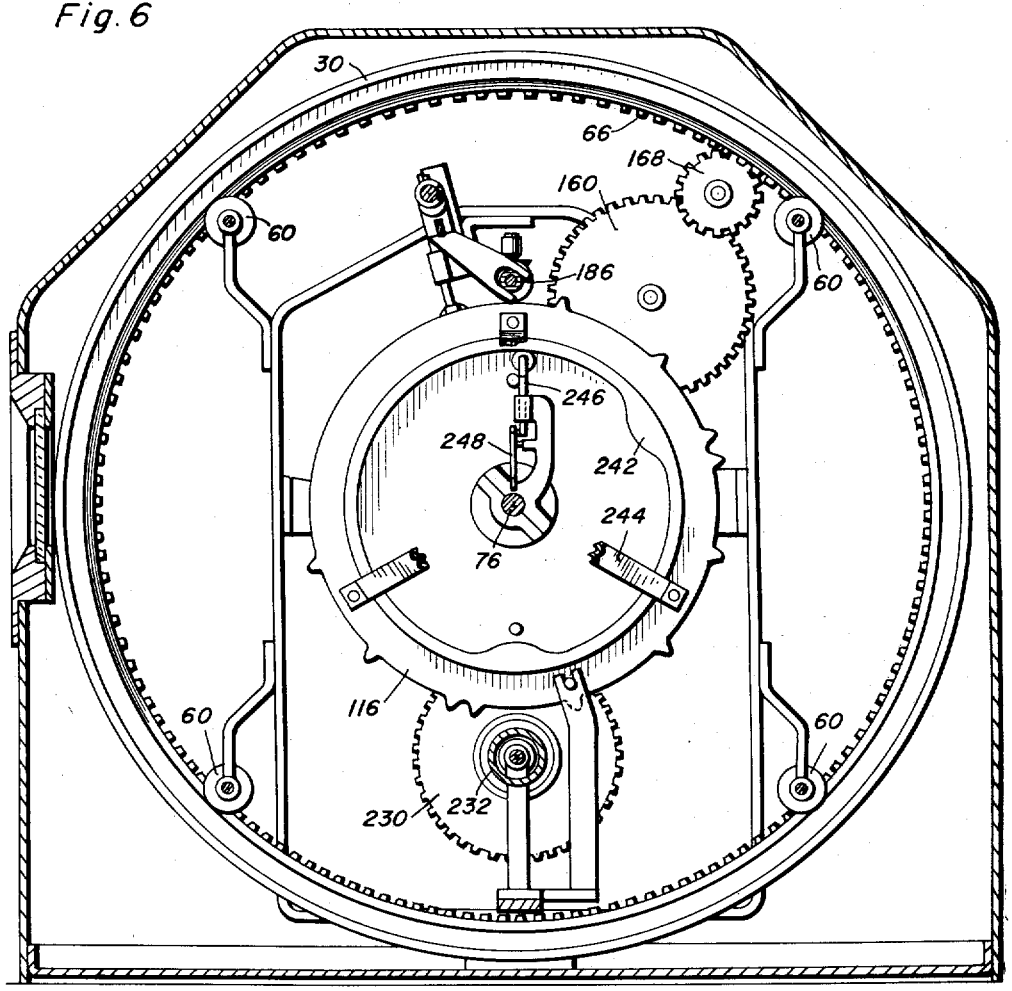
Figure 6 is a transverse sectional view taken substantially upon a plane passing along section line 6—6 in Figure 2 showing further details of construction.
Figure 15:
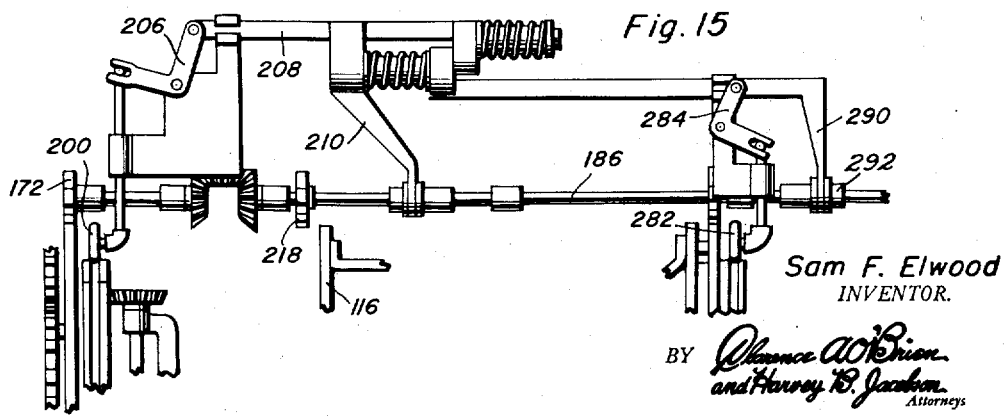
Figure 15 is a fragmentary view showing the position of a shift shaft employed in the machine.

Referring now specifically to the drawings, the numeral 10 generally designates the perpetual calendar machine of the present invention which includes an enlarged hollow housing 12 which may be of any desired configuration for encasing the various mechanical elements to be described hereinafter. The casing 12 includes an opening 14 having a frame 16 mounted therein for a transparent window 18 for revealing the data computed by the machine. Also provided on the housing 12 is a second or smaller opening 20 having a frame 22 therein for a smaller transparent window 24 for revealing another movable element of the machine. Projecting from one end of the housing 12 to an operating handle 26 attached to an elongated operating shaft 28 which extends into the interior of the housing 12 for operating the machine in a manner described hereinafter.

Rotatably disposed within the casing 12 is a plurality of disks or rings including disk 30 having numerical indicia 32 on the outer surface thereof for indicating tens of years or decades. This disk is located under the window 18 in such a manner that the indicia 32 will be revealed therethrough and this disk is located adjacent to century indicating indicia 34 which may be mounted on a century wheel if desired. Adjacent to the decade disk 30 and to the right thereof is a year disk 36 having numerical indicia 38 thereon for indicating the years.

Adjacent to the year disk 36 is a month disk 40 having indicia 42 thereon indicating the month of the year and adjacent to and to the right of the month disk 40 is a disk 44 indicating tens of days and a disk 46 indicating days with the disks 44 and 46 being provided with indicia 48 and 50 respectively. To the right of and spaced from the day disk 48 is a day of the week disk 52 having indicia 54 thereon indicating the day of the week of the day indicated by the other disks. The relationship of the disks is clearly shown in Figures 2 and 3 and the relationship of the indicia is clearly shown in Figure 1.

The disks 30, 36, 44 and 46 are substantially identical in construction and the disks 40 and 52 are substantially identical in construction and being slightly wider than the first mentioned disks. Each of the disks is substantially in the form of a ring and each of the disks is provided with an inwardly extending peripheral flange 56 having a tapered inner edge 58 for supporting engagement with grooved bearing wheels 60 for supporting the disks in position and for rotation in the housing 12. The bearing wheels 60 are supported from suitably arranged brackets 62 arranged in a manner for avoiding interference with the other mechanism within the housing but of sufficient rigidity and number to support the disks for rotation and prevent lateral deflection or other movement thereof which would tend to cause binding thereof.

Each of the disks also is provided with an inwardly extending annular flange 64 having gear teeth 66 thereon. In the disks 36, 40, 46 and 52, the gear flange 64 is to the right of the bearing flange 56 while on the disks 30 and 44, the gear flange is on the left side of the bearing flange 56.

Immediately underlying the indicia on the disks are numerical indicia 68 indicating the disk number and the same numerical indicia are provided along with additional descriptive indicia designated by numeral 70 immediately under the frame 22 for permitting a movable indicating arrow 74 to point to the indicia 70 for indicating which of the disks is being operated due to rotational movement of the handle 26 inasmuch as longitudinal movement of the shaft 28 will bring into operation one of the selective disks with the position of the shaft 28 being indicated by the indicating arrow 74 in a manner to be described hereinafter so that the person operating the device may determine which disk he is operating.

Disposed longitudinally within the housing 12 is an elongated main shaft 76 supported on bearings 78 which in turn are supported on bracket members 80 and 82 that are rigid with the casing 12. The main shaft 76 supports the majority of the operating mechanism and forms the rotational center for the operating mechanism. It is noted that the shaft 28 is in spaced parallel relation to the shaft 76 and is supported from the bearing brackets 84.

Figure 7:
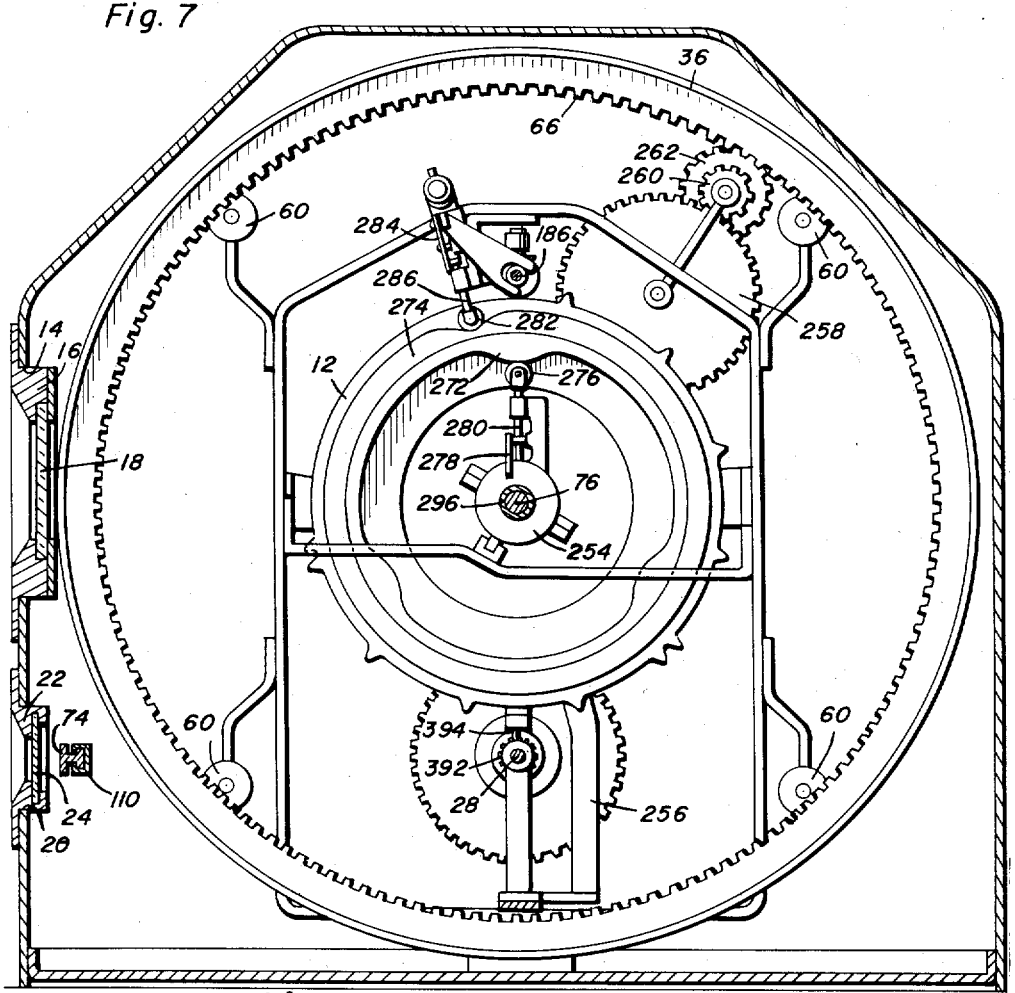
Figure 7 is a transverse sectional view taken substantially upon a plane passing along section line 7—7 in Figure 2 showing further structural details of the disk.
Figure 8:
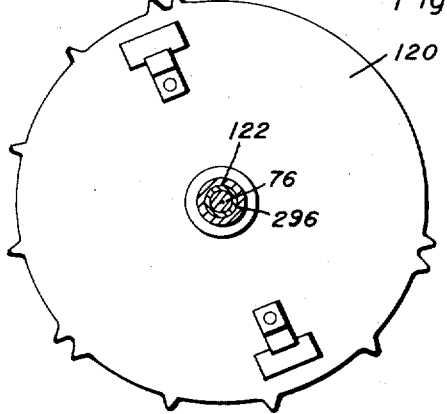
Figure 8 is a fragmentary transverse cross-sectional view taken substantially upon a plane passing along section line 8—8 of Figure 2.
Figure 9:
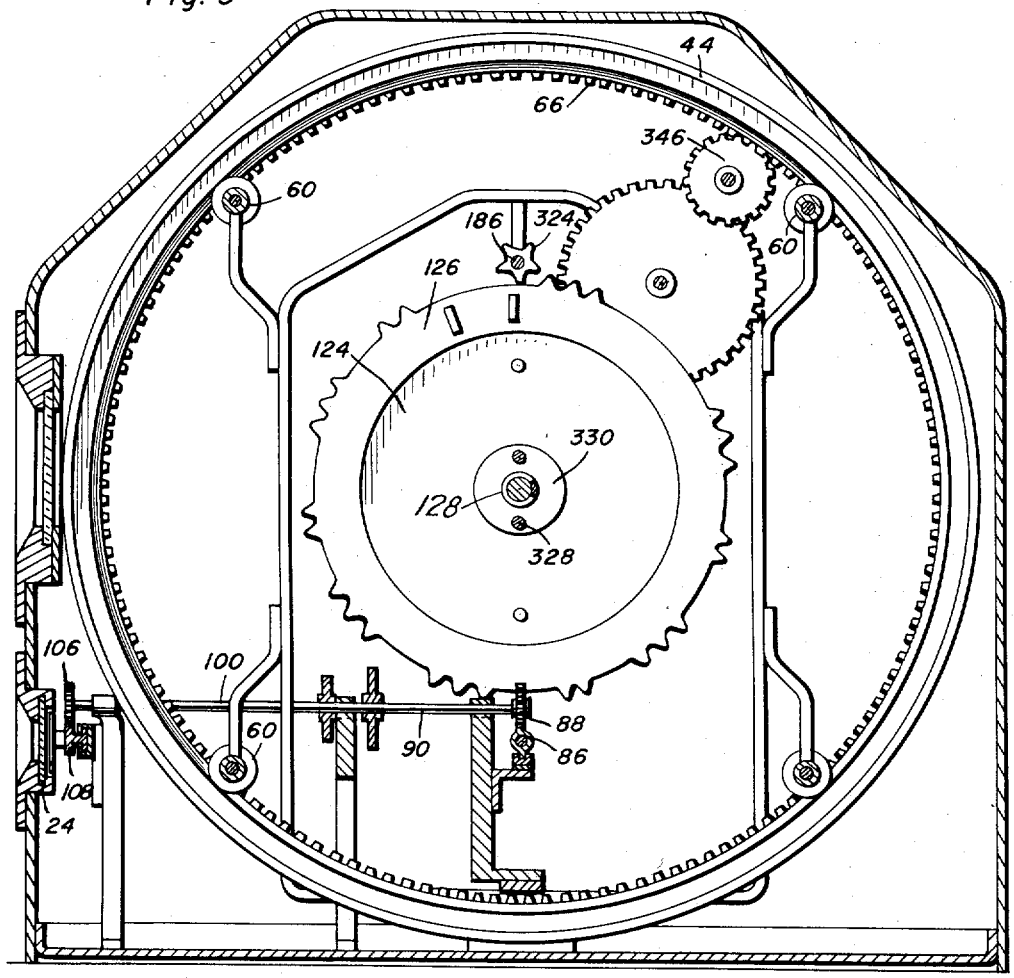
Figure 9 is a transverse sectional view taken substantially upon a plane passing along section line 9—9 in Figure 2 showing the disk for the months of regular years.
Figure 14:
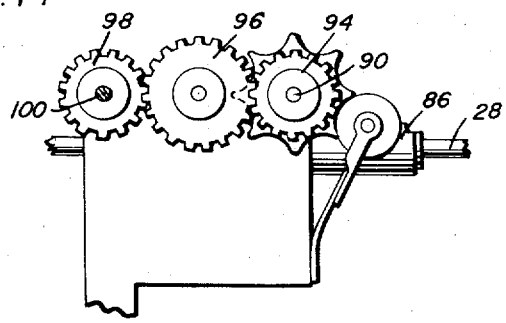
Figure 14 is a transverse sectional view taken substantially upon a plane passing along section line 14—14 in Figure 13.
Figure 10:
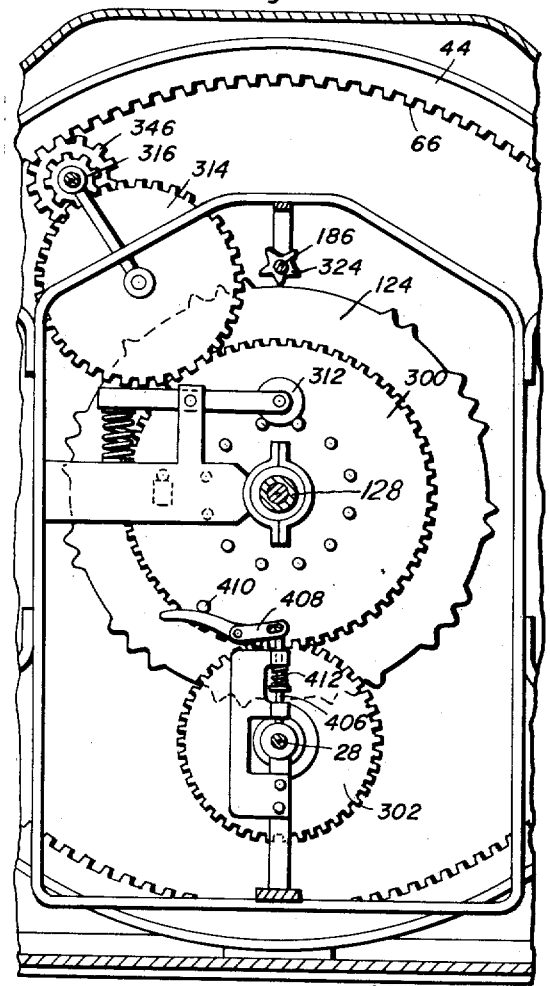
Figure 10 is a transverse sectional view taken substantially upon a plane passing along section line 10—10 in Figure 2 showing the disk for registering the months of leap years.
Figure 17:
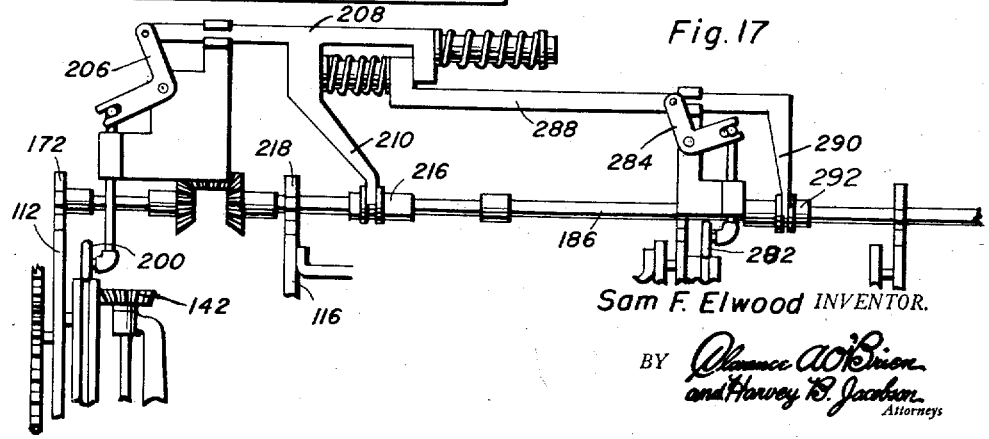
Figure 17 is a detailed sectional view showing additional shift mechanisms.
Figure 11:
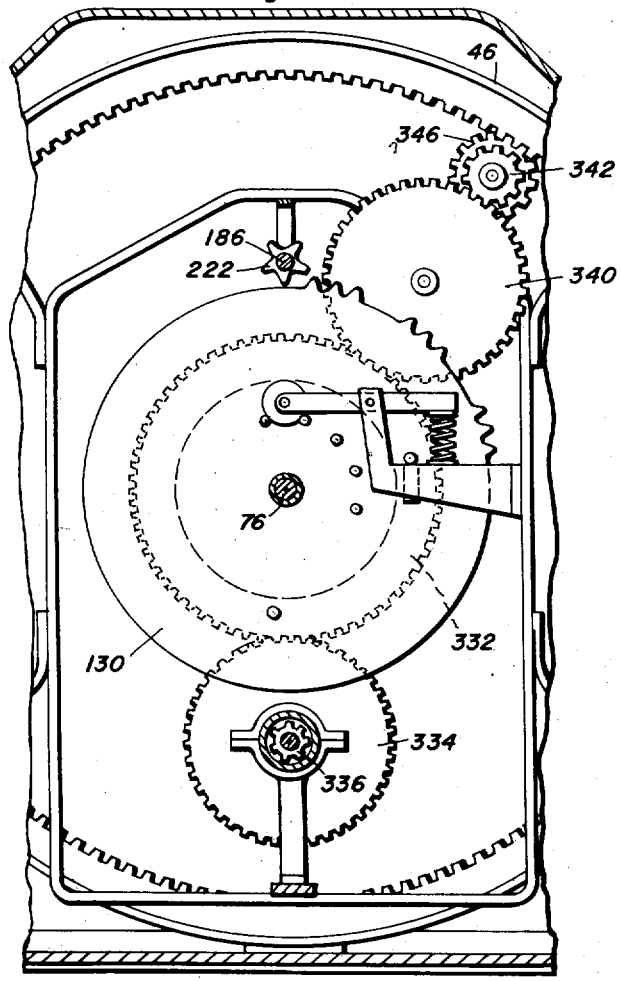
Figure 11 is a transverse sectional view taken substantially upon a plane passing along section line 11—11 in Figure 2 showing the disks for registering tens of days.
Figure 18:
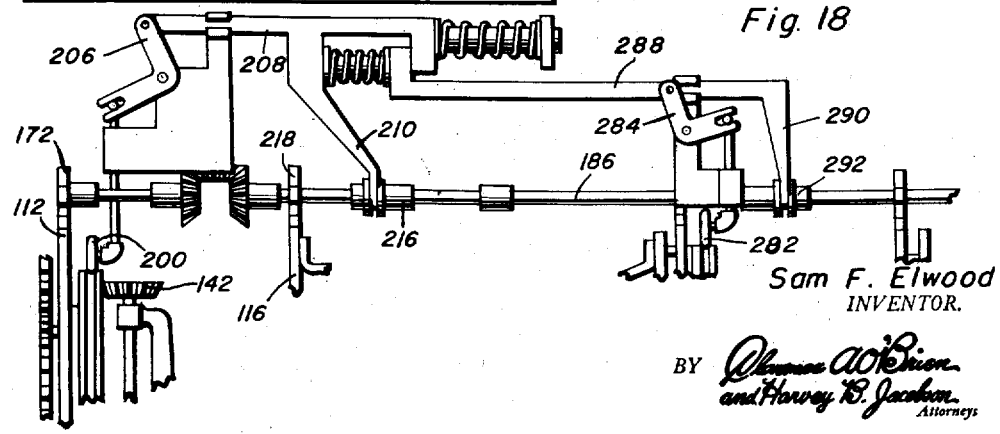
Figure 18 is a schematic view similar to Figure 17 showing additional relationship of elements.
Figure 12:
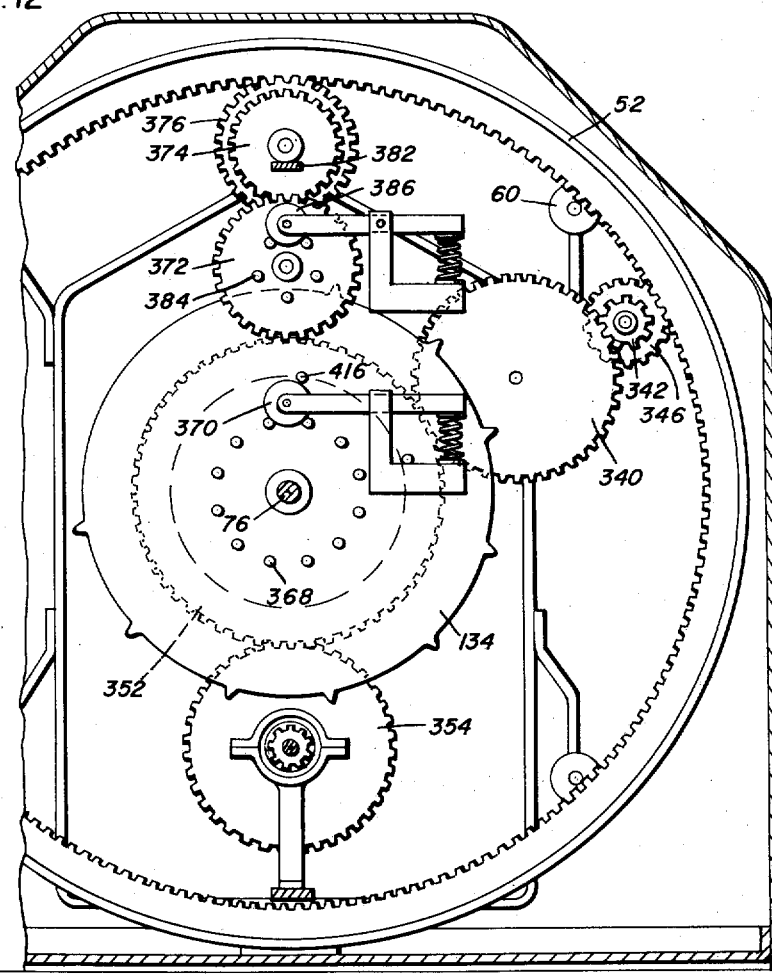
Figure 12 is a transverse sectional view taken substantially upon a plane passing along section line 12—12 in Figure 2 and shows the details of the disks for registering days.
Figure 19:
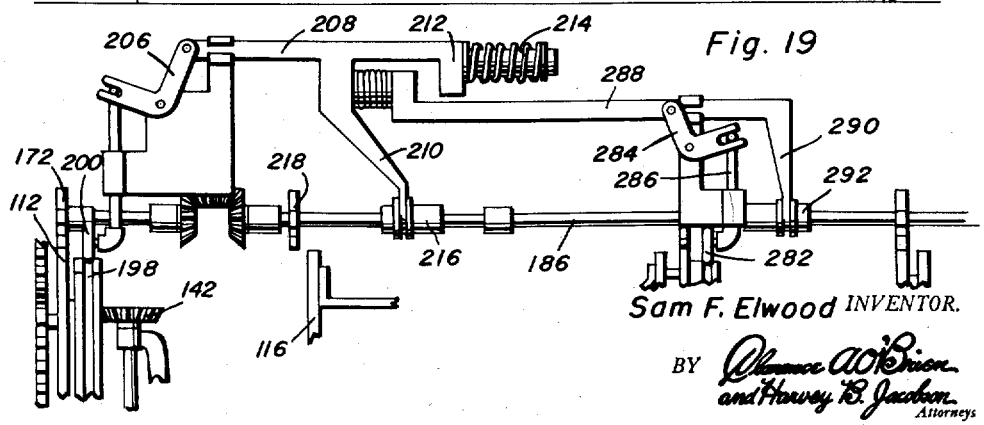
Figure 19 is a schematic view similar to Figure 18 showing further structural details of the shifting shaft.

The mechanism for operating the indicating pointer or arrow 74 is specifically illustrated in Figure 13 and also in Figure 2 and includes a rack 86 mounted on the shaft 28 for longitudinal movement therewith. The rack 86 is in meshing engagement with a pinion gear 88 mounted on a shaft 90 journaled in bearings 92 with the other end of the shaft 90 having a gear 94 thereon in meshing engagement with an idler gear 96 for turning a similar gear 98 in meshing engagement therewith with the gear 98 being mounted on a shaft 100 supported in bearings 102 and 104. The outer end of the shaft 100 is provided with a pinion gear 106 in meshing engagement with a movable rack 108 having the pointer 74 mounted forwardly thereof. As shown in Figure 7, the rack 108 is slidably disposed in a rectangular guide 100 for longitudinal sliding movement behind the transparent window 24. Thus by moving the shaft 28, the longitudinal movement thereof will be transmitted to movement of the indicating arrow 74 into alignment with the indicia 70 for indicating the position of the operating shaft 28 thus indicating the disk which will be operated. The shaft 28 is provided with five positions corresponding to the disks 30, 36, 40, 44 and 46 with the indicia 68 and 70 indicating these positions of the shaft 28.

Disposed on the elongated shaft 76 is a disk 112 provided with a bearing 114 with the disk 112 being disposed adjacent one end of the shaft 76 and the disk 112 is for the purpose of dialing decades on the disk 30. Disposed in longitudinally spaced relation to the disk 112 is a disk 116 for dialing years in the odd decades of years. The disk 116 is journaled on bearing 118. A disk 120 is provided on the shaft 76 and is journaled on bearing 122 for dialing the years of odd decades. Disks 124 and 126 are provided for dialing the months in leap years and in regular years, respectively, with the disk 124 being mounted on an elongated bearing 128 and the disk 126 being generally in the form of an annular member and being mounted from the disk 124. A disk 130 is provided for dialing the tens of days and is supported from a bearing 132 and a disk 134 is provided for dialing days with the disk 134 being also journaled on bearing 132.

The disk 112 is provided with a ring gear 140 rigid therewith with a bevel bearing 142 in meshing engagement therewith and mounted on a yoke 144. Also mounted on the disk 112 but on the opposite side thereof is a ring gear 146 in meshing engagement with a drive gear 148 journaled on a bearing 150 of tubular construction with the bearing 150 being supported from a bracket 152. The tubular member 150 permits sliding movement of a flange 154 on the shaft 28 for engaging a recess 156 in the flange with a spring urged dog or plunger 158 on the gear 148 thus locking the shaft 28 to the gear 148 whereby rotation of the shaft 28 will cause rotation of the gear 148 and thus rotation of the gear 146, disk 112 and ring gear 140. The flange 154 is in engagement with the dog 158 when the shaft 28 is at its outermost position to the right as viewed in Figure 2.

Also in meshing engagement with the gear 146 is an idler gear 160 on the opposite side from the drive gear 148 with the idler gear 160 being supported on a bearing 162 and in meshing engagement with a gear 164 on one end of a shaft 166 having a gear 168 on the other end thereof in meshing engagement with the teeth 66 on flange gear 64 on disk 30. The disk 112 is provided with a plurality of projecting teeth 170 disposed in circumferential relation and being arranged in the manner shown in Figure 4 for engagement with a gear 172 mounted on one end of a shaft 174 supported from bracket means 176 which has a bevel gear 178 on the other end thereof for meshing engagement with an idler gear 180 mounted on a bracket 182 with the idler gear 180 in turn being in meshing engagement with a bevel gear 184 on an elongated shaft 186, whereby the direction of rotation of shaft 186 will be opposite to that of shaft 174.

Extending outwardly from the face of disk 112 is a plurality of circumferentially spaced pins 188 having a roller 190 engaging the same. The roller 190 is mounted on a pivotal carrier arm 192 supported from a bracket 194 with a compression spring 196 being provided for urging the roller 190 into engagement with the projecting pins 188 thus resiliently and frictionally holding the ring gear and disk 112 in position. The ring gear 140 is provided with a cam 198 having a roller 200 for engaging the same with the roller 200 being mounted on the end of a rod 202 slidably supported in a bracket 204 with the free end of the rod 202 being connected with a bell crank 206 pivotally supported at its apex and having the outer end of the other arm thereof connected to an actuating rod 208 having a depending arm 210 thereon adjacent the center together with an abutment 212 having a compression coil spring 214 associated therewith for urging the member 208 to a normal position. The depending arm 210 is connected with a collar 216 on the rod 186. The collar 216 causes the shaft 186 to slide in relation to gear 218 thereon by virtue of a slip joint construction of a known type and for bringing the gear 220 in engagement with the disk 120 and a gear 222 in selective engagement with the disk 130. The inner end of the yoke 144 is provided with a roller cam 224 engageable with the end of the bearing 118 which also is provided with a bearing 226 having a gear 228 in meshing engagement with a gear 230 journaled on an elongated tubular sleeve 232 supported by a bracket 234. The gear 228 is provided with projecting pins 233 having a spring urged roller follower 235 engaging the same. The gear 228 is also provided with projecting lugs 236 having apertures for receiving projecting pins 238 on disk 116 which has also projecting pins 240 extending the other way for engagement with a cylindrical member 242. The drum 242 is disposed within a housing 244 connected with disk 116 and the drum 242 has a cam follower 246 disposed therein for engagement with the inner surface with the cam follower 246 being connected with a bell crank 248 for engagement with the slidable sleeve 128 having a housing 244 connected thereto for urging the housing and disk 116 in such a manner to bring the pins 240 into engagement with apertures in the drum thus locking the drum 242 to the disk 116.

The position of the elements shown in the drawings is for the year 1900 and for the other years of this first decade all positions are the same except for certain of the cam mechanisms.

The cam 224 is rotated by virtue of the gear 142 90° for each number dialed on disk 112. Due to the substantially oval shaped configuration of the cam 224, this will cause reciprocation or sliding movement of the sleeve 118 on the shaft 76 due to the spring 250 urging the sleeve 118 towards the cam 224. Figure 4 illustrates a narrow view of the cam 224 and its relationship to the sleeve 118. Also, Figure 4 shows the mounting yoke 144 and the manner in which it is supported from the casing. Due to the bearing 226 which is rotatably and slidably disposed on the sleeve 118, the disk 228 will not move longitudinally during sliding movement of the sleeve 118 thus the disk or gear 228 will be in constant mesh with the gear 230. The roller 234 and pins 232 will act to retain the gear 228 in position in the same manner as the disk 112 is retained in position.

The disk 116 is mounted on the sleeve 118 for longitudinal sliding movement therewith for selectively engaging the lugs 240 with the drum 242 or disengaging the same therefrom so that when the lugs 240 are disengaged therefrom, the lugs 238 will be engaged with the apertured brackets 236 for driving the disk 116 from the gear 228. When the disk 116 is moved longitudinally, the bracket arms 224 will be moved longitudinally thus picking up and moving the sleeve 122 along with the sleeve 118. Thus sleeve 118, disk 116, bracket arms 244 and sleeve 122 move longitudinally as one rigid element in response to movement by the cam 224 in one direction and in a return direction by the spring 250.

Rotatably mounted on the bearing 12 is a gear 252 by virtue of a bearing sleeve 254 which is in meshing engagement with the gear 256 on the opposite end of each tubular sleeve 232 from the gear 230 and which is supported on the support 234. The gear 252 is in meshing engagement with an idler gear 258 which in turn drives a drive gear 260 having a second drive gear 262 rigid therewith and engaging the gear 66 on the disk 36 thus driving the disk 36 for indicating the years in each decade.

The gear 252 is provided with outwardly extending apertured brackets 264 for engagement with inwardly extending brackets 266 having pins 268 thereon for extending through the brackets 264. The lugs or brackets 266 are rigid with the disk 120, with the disk 120 being spaced from the disk 116 in such a manner that when the gear 228 is not driving the disk 116, then the gear 252 is driving the disk 120. The disk 120 is also provided with a drum 270 haivng an internal cam 272 and an external cam 274. A follower 276 is provided for the internal cam which is connected to a bell crank 278 through an operating rod 280. The external cam 274 is provided with a follower roller 282 connected to a bell crank 284 through an operating rod 290. The bell crank 284 is connected with a slidable member 288 similar in structural arrangement to the member 208 and includes a depending arm 290 engaging over a fitting 292 on the shaft 186.

The bell crank 278 has the free end thereof engaged with a flange 294 on an elongated sleeve 296 which also has a flange 298 in position for engagement by the bell crank 248 operated by the shaft 246 which is controlled by the cam drum 242 selectively locked with the disk 116. The elongated sleeve 296 is disposed slidably on the main shaft 76 and is disposed interiorly of the sleeve 122. Journaled on the sleeve 296 is a gear 300 in meshing engagement with a gear 302 concentric with the operating shaft 28 and supported from bracket means 304. The gear 302 is provided with a spring urged catch or dog 306 for selective engagement with a gear 308 on the shaft 28 whereby longitudinal movement of the shaft 28 may bring the gear 308 into engagement with the dog 306 thus picking up or locking the shaft 28 to the gear 302 for rotating the gear 302 and subsequently the gear 300. The gear 300 is provided with a plurality of radially extending pins 310 for engaging a spring urged roller 312 which retains the gear 300 in position unless the resistance to turning exerted by the roller 312 is overcome. The gear 300 is also in meshing engagement with an idler gear 314 which in turn is in meshing engagement with a gear 316 mounted on upper shaft 318 having a gear 320 thereon in meshing engagement with the gear teeth 66 on the disk 40 thereby permitting registry of months.

The gear 300 is locked to the disks 124 and 126 by virtue of projecting pins 322 and selectively engage a gear 324 on the shaft 186 which is moved longitudinally by virtue of the internal cams 272 on the drum 270 and on disk 112 whereby disk 124 will turn the shaft 186 if the year is a leap year and the disk 126 will turn the shaft 186 if it is a regular year.

A spring 326 is disposed between the outer end of the sleeve 296 and a sleeve 132 for urging the sleeve 296 to a position to the left in Figure 2. The sleeve 132 and sleeve 296 is kept in longitudinal alignment by projecting longitudinal pins 328 secured to the sleeve 132 and slidably disposed in a flange 320 on sleeve 296.

Rotatable on sleeve 132 is a disk 130 having an annular gear 332 rigid therewith and in meshing engagement with a small drive gear 334 concentric with the shaft 28 with the shaft 28 being provided with a gear 336 movable in relation to the gear 334. The gear 334 is provided with a spring urged dog 338 selectively engageable with the gear 336 whereby the gear 334 may be locked to the shaft 28 thus driving the gear 332 and the disk 130 for engaging the gear 222 on the shaft 186. The gear 332 is in meshing engagement with an idler gear 340 which in turn is in meshing engagement with a gear 342 mounted on one end of the shaft 344 which has the other end thereof provided with a gear 346 in meshing engagement with the gear teeth 66 on the disk 44 thus registering tens of days.

The disk 130 is provided with projecting pins 348 for association with a spring urged roller 350 for holding the disk in position until it is actuated by the shaft 28.

Rotatably disposed on the sleeve 132 is also the disk 134 having a gear 352 rigid therewith the gear 352 being in meshing engagement with a drive gear 354 arranged in concentric relation to the shaft 28. The drive gear 354 is provided with a spring urged dog 356 for meshing engagement with a gear 358 on the shaft 28 so that when the shaft 28 is pushed inwardly to the fit position, the gear 358 will engage the dog 356 thus picking up the gear 354 and driving the gear 352 which is in meshing engagement with a gear 360 on a shaft 362 having a gear 364 on the inner end thereof for engagement with the gear teeth 66 on the disk 46 thus registering the days through the transparent window.

The disk 134 is in alignment with and is adapted for engagement with a gear 366 on the shaft 186. Also, the disk 134 is provided with a plurality of projecting circumferentially spaced cams 368 for engagement with a spring urged roller 370 for retaining the disk 134 stationary until such time as it is actuated by the shaft 28 through the gears 358, spring dog 356, gear 354 and gear 352.

The shaft 186 is provided with a gear 372 on the end thereof in meshing engagement with a gear 374 which has rigid therewith a drive gear 376 in meshing engagement with the internal gear teeth 66 on the disk 52 for indicating the day of the week of the date dialed by the shaft 28 in a manner described hereinafter. The gears 374 and 376 are mounted on a shaft 378 supported in a bearing 380 which in turn is supported by a bracket 382 of any suitable construction. Also, the gear 372 is provided with a plurality of circumferentially spaced projecting pins 384 for engagement with a spring urged roller 386 for retaining the gear 372 and the disk 52 in position until such time as the same is actuated by the shaft 186. It is pointed out that the details of the spring urged rollers are the same with the details being shown in Figure 4 and described in detail in conjunction with the roller 190.

Except for orientation above or below the shaft and except for differences in specific mounting brackets, the rollers 190, 234, 312, 350, 370 and 386 are of substantially identical construction for substantially the same purpose, that is retaining the associated rotatable elements in non-rotative position until they are positively driven by the operating mechanism.

The shaft 28 is provided with a projecting peripheral flange 388 and a similar flange 390 thereon with the flange 388 being adjacent the gear 154 and the flange 390 being adjacent the gear 308 but between the gear 308 and a gear 392 which is adapted to engage a spring urged dog 394 rigid with the gear 256 which will cause rotation of the tube 232 and the gear 230 simultaneously since they become one unit. The flange 388 is disposed for engaging a spring urged plunger 396 having an actuating arm 398 supported on a pivot pin 400 with a spring 402 being provided for urging the plunger 396 downwardly into the path of movement of the flange 388. The arm 398 extends upwardly alongside of the gear 228 for engagement with a pin 404 thereon for releasing or withdrawing the plunger 396 for permitting the flange 288 to proceed past the plunger 396 for registering the gear 154 with the spring urged dog 158. The pin is positioned so that the plunger 396 will be withdrawn only when the disk 36 designating the years in the decade has been moved to zero thus assuring that the device will not move from position 2 to position 1 for dialing the decade years until such time as the disk for dialing the years in the decade has been moved to zero.

A similar mechanism is associated with the flange 390 and includes a plunger 406 operated by an arm 408 engageable by a pin 410 on the gear 300. A spring 412 is provided for urging the plunger 406 into the path of movement of the flange 390 whereby the plunger will be withdrawn when the gear 300 moves the month indicating ring 40 to the first month or to the zero position before the shaft can move on to position 2 or for dialing the days in the decade except when the disks 124 and 126 are in the zero position. Thus, in dialing a date, the mechanism must initially be returned to a position so that the rings or disks 40, 36 and 30 are in a zero position.

The present device is calibrated for finding the week days of dates in the twentieth century whereby the date may be dialed and the day of the week of this date will be indicated. On the rear elevation of the machine or on any other convenient position, the rules to find the week days for date in the 19th and 21st centuries may be imprinted. In finding the week day of a date in the 19th century, the corresponding date in the 20th century should be dialed and for the 19th century add two days to this day of the week. For the 21st century, one day should be subtracted from the dialed weekday in the corresponding date in the twentieth century except for the first two months of the 21st century and in these two months two days should be subtracted instead of one. Thus, January 1, 1900, falls on Monday and adding two days, January 1, 1800, falls on Wednesday and January 1, 2000, will fall on Saturday by subtracting two days.

A century disk may be provided for making the machine truly perpetual since any date from October 1752 to December 2399 could be dialed. Since the calendar repeats every 400 years, its range would be unlimited as far as the future is concerned. Also, there may be provided in the left corner of the machine a window showing the number of days and the holidays for each month which may be manipulated by a thumb screw. Also, there may be provided an arrow pointing to either a leap year or regular year for indicating whether the year is a leap year or regular year and this arrow would be activated by shifting of the month disks 124 and 126.

The cam positions shown in Figure 2 are for the year 1900 and for the other years of this first decade all of the positions are the same except cam mechanism 292 as moved upwardly and for the regular years of this decade cam mechanism 246 has moved. For all of the leap years of the even decades, except the first decade, the cam positions are shown in Figure 2 except that cam mechanism 276 has moved outwardly. For all of the regular years of the even decades, except for the first decade, the cam positions are as shown in Sheet 2 except for cam mechanism 276 has shifted for shifting the disks 124 and 126.

The operation of the invention will be explained by employing several examples of the use of the device. In determining the week day of January 1, 1900, the crank is pushed into the No. 5 position thus actuating disk 134 and by dialing the numeral 1 on the disk 46, the disk 52 will register Monday.

To dial January 1, 1909, the date crank and shaft 28 is pushed into the No. 2 position and in this position gear 252 and disks 120 and 121 will be actuated and the shaft rotates the disk 36 until a 9 appears. There are eleven cogs on 121 from zero to 9 hence 11 days is registered on disk 52. The crank is now pushed into No. 5 position for activating disk 134 which is turned until No. 1 is registered on disk 46 which registers one day on disk 52 thus a total of twelve days has been registered on 52 and counting off 12 on disk 52, it will be seen that the disk 52 will register Friday for this date.

In order to dial March 15, 1935, the shaft 28 is pushed into the No. 1 position thus activating disk 112 and disk 112 is rotated until the numeral 3 will be seen on disk 30. There are 5 cogs from zero to 3 on disk 30 all of which are negative due to the gearing 178 and 184 thus the disk 52 will be rotated five days in reverse. The crank or shaft 28 is then pushed to the No. 2 position for activating the disk 116 since this is a regular year in an odd decade. The shaft 28 is then rotated until a 5 is dialed on disk 36. There are 6 cogs on disk 116 from zero to 5 therefore disk 52 will rotate 6 days. The crank is then pushed to position No. 3 activating disk 126 and the crank is rotated to March on disk 40. There are three cogs on disk 126 from January to March, therefore, disk 52 will rotate three days. The crank or shaft is now pushed into position No. 4 for activating disk 130 and rotated to 1 on disk 44. There are three cogs from zero to one on disk 130 therefore disk 52 will move three days. The crank is now pushed into position No. 5 for activating disk 134 and the crank is rotated until 5 is dialed on disk 46. There are five cogs on disk 134 from zero to 5 hence disk 52 will register 5 days. Thus we have negative 5 for disk 112, plus 6 for disk 116, plus 3 for disk 126, plus 3 for disk 130 and plus 5 for disk 134 or a total of 12 registered on disk 52 and counting off 12 on disk 52, it will be seen that disk 52 will register Friday for this date.

All the disks with cogs for motivating the day of week shaft have travel limit stops which allows the disks to revolve only through the range of the cogs thereon. These travel limit stops are designated by numeral 416 and prevents complete revolution of the disks which would throw the day of the week register out of step.

The shaft 186 is slidable in a slip joint on gear 218, collar 216, collar 292 and member 325 for permitting shifting of the gears in response to the various cams. Cam 210 controls the position of gear 220 and cam 216 controls the position of gear 334. The purpose of 203 and 288 is to get the gears 220 and 334 in the correct positions for the respective years.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A calendar machine comprising a main shaft having six equal-sized rings arranged in longitudinally spaced relation, one of said rings indicating decades, a second of said rings indicating years in the decades, a third of said rings indicating months, a fourth of said rings indicating tens of days, the fifth of said rings indicating days and the sixth of said rings being driven by the other of said rings for indicating the day of the week of the date formed by the first five rings, an actuating mechanism for said rings, including an elongated slidable shaft having a crank handle on one end thereof, five drive gears disposed on said slidable shaft in longitudinally spaced relation, an independent gear drive mechanism for each of the first five rings, said drive gears on the slidable shaft being spaced apart a distance greater than the gear drive mechanisms for selective engagement with the drive mechanisms for the rings, and means connected with the slidable shaft for indicating the position of the slidable shaft for indicating the ring to be actuated.

2. A calendar machine comprising a main shaft having six equal-sized rings arranged in longitudinally spaced relation, one of said rings indicating decades, a second of said rings indicating years in the decades, a third of said rings indicating months, a fourth of said rings indicating tens of days, the fifth of said rings indicating days and the sixth of said rings being driven by the other of said rings for indicating the day of the week of the date formed by the first five rings, an actuating mechanism for said rings, including an elongated slidable shaft having a crank handle on one end thereof, five drive gears disposed on said slidable shaft in longitudinally spaced relation, an independent gear drive mechanism for each of the first five rings, said drive gears on the slidable shaft being spaced apart a distance greater than the gear drive mechanisms for selective engagement with the drive mechanisms for the rings, each of said gear drive mechanisms including an enlarged gear mounted on a central shaft, each of said rings having an internal ring gear thereon, reduction gear means interconnecting the enlarged gear and the internal ring gear, and an idler gear means meshed with the enlarged gear and adapted to be meshed with one of the drive gears on the slidable shaft for independently driving said rings.

3. The combination of claim 2 wherein the sixth ring is driven through a gear train from an elongated lay shaft, said lay shaft having a plurality of star wheel type pinions thereon in longitudinally spaced relation, and means interconnecting the pinions and an enlarged gear for partially transmitting the rotation of the enlarged gear to the sixth ring.

4. The combination of claim 2 wherein said means interconnecting the pinions and enlarged gears includes a circular disk having a plurality of radial projections thereon for meshing with an adjacent pinion on the lay shaft, said disks being driven from said enlarged gears.

5. The combination of claim 4 wherein said gear for driving the first ring has a disk rigidly connected therewith, means connecting the first disk to the lay shaft for causing reverse rotation thereof, an external cam on said disk, a follower engaged with said cam for movement away from the disk when the first ring indicates the first decade in the twentieth century for controlling rotation of the lay shaft during the years of this decade.

6. The combination of claim 5 wherein said first disk is provided with a side ring gear, a radial shaft having a pinion thereon in mesh with the side ring gear, an oval-shaped cam on the inner end of said radial shaft, a spring-urged sleeve slidable on said main shaft, a flange on said sleeve for engagement by said oval-shaped cam, said oval-shaped cam sliding the sleeve in response to registry of odd and even decades on the first ring, said sleeve controlling operation of the lay shaft by the second enlarged gear.

7. The combination of claim 6 wherein the second enlarged gear is provided with a pair of longitudinally movable disks rigid with said sleeve, a secondary enlarged gear driven at the same rate of speed as the second gear, clutch means selectively locking the one of said pair of disks to the second gear and the other of said disks to the secondary enlarged gear and selectively meshing with projections on spaced star wheel pinions on the lay shaft whereby actuation of the lay shaft will be different during odd and even decades.

8. The combination of claim 7 wherein each of said disks is provided with an internal cam mechanism, the other of said pair of disks having an external cam mechanism for shifting a portion of the shaft, each of said internal cam mechanisms including a bell crank for operating a sliding sleeve, a pair of disks rigid with the third enlarged gear and slidable with the sleeve for selectively engaging a star wheel pinion on the lay shaft whereby the action on the lay shaft is determined by the internal cam mechanisms which are actuated in response to the occurrence of leap years.

9. The combination of claim 8 wherein said fourth and fifth gears are each provided with a disk in engagement with pinions on the lay shaft for moving the sixth ring for indicating the day of week of the date dialed on the five rings, the rotation of the sixth ring indicating the summation of the projections on the disks.

10. The combination of claim 9 wherein locking mechanism is provided in the path of movement of the drive gears on the slidable shaft, and means responsive to movement of certain of the rings to zero position for permitting the sliding shaft to move to an initial position.

References Cited in the file of this patent
UNITED STATES PATENTS

| | | |
|---|---|---|
| 2,026,882 | Germundsson | Jan. 7, 1936 |
| 2,338,377 | Gatewood | Jan. 4, 1944 |
| 2,435,069 | Botham | Jan. 27, 1948 |
| 2,774,160 | Gilson | Dec. 18, 1956 |